(12) United States Patent  (10) Patent No.: US 7,708,970 B2
Hesse et al.  (45) Date of Patent: May 4, 2010

(54) PROCESS FOR DEPOSITING POLYCRYSTALLINE SILICON

(75) Inventors: Karl Hesse, Burghausen (DE); Franz Schreieder, Tann (DE)

(73) Assignee: Wacker Chemie, Munich (DE)

( * ) Notice: Subject to any disclaimer, the term of this patent is extended or adjusted under 35 U.S.C. 154(b) by 0 days.

(21) Appl. No.: 12/352,021

(22) Filed: Jan. 12, 2009

(65) Prior Publication Data

US 2009/0180944 A1   Jul. 16, 2009

(30) Foreign Application Priority Data

Jan. 14, 2008   (DE) .................. 10 2008 000 052

(51) Int. Cl.
C01B 33/02   (2006.01)
(52) U.S. Cl. .................. 423/349; 423/341; 423/342; 423/343; 423/347
(58) Field of Classification Search .................. None
See application file for complete search history.

(56) References Cited

U.S. PATENT DOCUMENTS

| | | | |
|---|---|---|---|
| 3,933,985 A | 1/1976 | Rodgers | |
| 4,252,780 A | 2/1981 | Koeppl et al. | |
| 4,340,574 A | 7/1982 | Coleman | |
| 6,007,869 A * | 12/1999 | Schreieder et al. | 427/213 |
| 6,846,473 B2 * | 1/2005 | Kirii et al. | 423/342 |
| 2003/0147798 A1 | 8/2003 | Kirii et al. | |
| 2008/0056979 A1 * | 3/2008 | Arvidson et al. | 423/350 |
| 2008/0299291 A1 | 12/2008 | Weidhaus et al. | |

FOREIGN PATENT DOCUMENTS

| | | |
|---|---|---|
| DE | 29 18 066 A1 | 11/1980 |
| DE | 10 2006 009 953 A1 | 9/2007 |
| DE | 10 2007 021 003 A1 | 11/2008 |
| EP | 1264798 A | 12/2002 |
| JP | 01188414 A | 7/1989 |
| JP | 01-192716 * | 8/1989 |
| JP | 09263405 A | 7/1997 |

(Continued)

OTHER PUBLICATIONS

William C. O'Mara et al., Handbook of Semiconductor Silicon Technology, Polysilicon Preparation, p. 77.

(Continued)

*Primary Examiner*—Melvin C Mayes
*Assistant Examiner*—Smita Patel
(74) *Attorney, Agent, or Firm*—Brooks Kushman P.C.

(57) ABSTRACT

Polycrystalline silicon is prepared by thermally decomposing a reaction gas comprising hydrogen and a silicon-containing gas in a reaction chamber containing heated silicon, depositing additional silicon thereon, and forming an offgas; and separating the offgas into a first fraction comprising trichlorosilane and lower boiling chlorosilanes, and a second offgas fraction comprising components having a higher boiling point than trichlorosilane;

recycling the first offgas fraction to the reaction gas of a polycrystalline silicon deposition; and separating the second offgas fraction into tetrachlorosilane and a high boiler fraction of high boilers, optionally also containing some tetrachlorosilane, and supplying the high boiler fraction to the reaction gas of a silicon deposition and heating the reaction gas to a temperature which ensures that the high boiler fraction is present in gaseous form on entry into the reaction chamber of the deposition reactor.

18 Claims, 3 Drawing Sheets

FOREIGN PATENT DOCUMENTS

| | | |
|---|---|---|
| RU | 2278075 C2 | 1/2006 |
| RU | 2004124874 A | 1/2006 |
| WO | 02/12122 A1 | 2/2002 |
| WO | 02/100776 A1 | 12/2002 |
| WO | 2005085133 A | 9/2005 |
| WO | 2008027101 A | 3/2008 |

OTHER PUBLICATIONS

William C. O'Mara et al., Handbood of Semiconductor Silicon Technology, p. 72.

* cited by examiner

PROCESS FOR DEPOSITING POLYCRYSTALLINE SILICON

CROSS-REFERENCE TO RELATED APPLICATIONS

This application claims priority to German application DE 10 2008 000 052.3 filed Jan. 14, 2008, which is herein incorporated by reference.

BACKGROUND OF THE INVENTION

1. Field of the Invention

The present invention relates to a process for depositing polycrystalline silicon.

2. Background Art

When polycrystalline silicon is prepared by chemical gas phase deposition of chlorinated silanes, for example trichlorosilane or dichlorosilane, by decomposing the gases over glowing silicon surfaces such as rods (Siemens process) or granules (fluidized bed process), silicon deposits on the hot surfaces in the primary reaction, and tetrachlorosilane forms as a by-product. The deposition of polycrystalline silicon from trichlorosilane is based on thermal equilibrium processes of chlorosilanes. For example, in trichlorosilane deposition, depending upon the reaction conditions, the main reactions are:

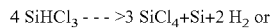

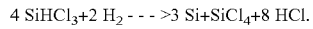

Chlorosilanes which can be condensed as a liquid from the offgas ("offgas condensate") of the silicon deposition reactors include, in addition to dichlorosilane, trichlorosilane and silicon tetrachloride, depending upon the deposition conditions, 0.001-3% by weight of high-boiling chlorosilanes, ("high boilers"), which are formed in side reactions. High-boiling chlorosilanes are compounds which consist of silicon and chlorine, with or without hydrogen, oxygen and carbon, and have a higher boiling point than tetrachlorosilane (57° C. at 1013 hPa). They are preferably disilanes of the formula $H_nCl_{6-n}Si_2$ (n=0-6), oligo(chloro)silanes of the formula $H_{2n-m}Cl_mSi_n$ (n=2 to 68, preferably 2 to 4 and m=0 to 2n), disiloxanes of the formula $H_nCl_{6-n}Si_2O$ (n=0-4), siloxanes of the formula $H_3Si—[O—SiR_2]_n—O—SiH_3$ (n=1 to 4, preferably 1 or 2; R is independently H, Cl or $CH_3$), and cyclic oligosiloxanes of the formula

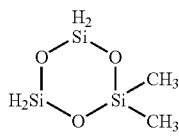

and the methyl derivatives thereof. In a typical composition, these high-boiling chlorosilanes consist of about 50% by weight of $Si_2Cl_6$, >34% by weight of $Si_2HCl_5$, 10% by weight of $Si_2H_2Cl_4$ (2 isomers), 5% by weight of $Si_2H_2Cl_3$ (2 isomers) and <1% by weight of even higher-boiling chlorosilane components.

For the processing of the offgases from polysilicon deposition, various processes are known: DE2918066 describes a process in which all chlorosilanes obtained in the condensate from the polysilicon deposition are supplied back to the reactant gas of the deposition. The serious disadvantage of this process is the extremely low deposition rate of silicon, which is caused by the high concentration of tetrachlorosilane which arises in the equilibrium in the reactant gas, which makes the deposition process uneconomical (W. C. O'Mara, R. B. Herring, L. P. Hunt, Handbook of Semiconductor Silicon Technology, ISBN 0-8155-1237-6, p. 77, 1990).

In the commercially used process known as the Siemens process for preparing rod-shaped polycrystalline silicon by means of trichlorosilane deposition, it is therefore customary to only recycle, chlorosilanes with a boiling point lower than the boiling point of trichlorosilane, together with the unreacted trichlorosilane from the offgas, back to the Siemens deposition reactor for preparation of polycrystalline silicon. The tetrachlorosilane obtained is removed by distillation from the offgas stream and either converted to trichlorosilane (Motorola, U.S. Pat. No. 3,933,985) or used as a starting material for other chemical products, for example fumed silica or tetraethyl silicate (cf. Handbook of Semiconductor Silicon Technology, ISBN 0-8155-1237-6, p. 72, 1990). The high boilers which are likewise obtained are either disposed of (e.g. U.S. Pat. No. 4,252,780) or converted to monomers. This is done either by reaction with tetrachlorosilane and hydrogen, or by cracking with HCl (Osaka Titanium, JP Hei 1-188414; Tokuyama, JP H09-263405; Union Carbide, U.S. Pat. No. 4,340,574; Hemlock, WO 02/100776 A1).

It is also known that high-purity hexachlorodisilane $(H_2Si_2Cl_6)$ can be isolated from the offgases of the deposition of polycrystalline silicon (WO 2002012122). However, the isolation of these high boiler fractions as a starting material for specific epitaxy applications or for preparation of silicon polymers is very complicated.

All processes of this type for processing high boilers are associated with yield losses, especially of chlorine and silicon, environmental pollution by hydrolysis products, or complicated plants and processes. Moreover, in the recycling processes described to give monomers, the semiconductor purity of the compounds present in the condensate is lost. This first has to be reestablished by means of complicated purification steps, preferably by distillation, before the products can be used again in the deposition process.

One economically viable use of high boilers is described by DE 102006009953, where the high boilers are used to prepare fumed silica. A disadvantage is that along with the preparation of polysilicon, the preparation of fumed silica also has to be conducted, which requires a "coupling" of these different products, which is not always desired.

SUMMARY OF THE INVENTION

It is an object of the invention to provide an inexpensive process which enables the reutilization of high boilers from the deposition of polycrystalline silicon. These and other objects are achieved by recycle of low boilers from the offgas to the deposition reactor, together with a tetrachlorosilane-depleted high boiler fraction, heated to a temperature sufficient to ensure that all the high boilers have been vaporized prior to entry into the deposition reactor.

DETAILED DESCRIPTION OF THE PREFERRED EMBODIMENT(S)

Figure 1:
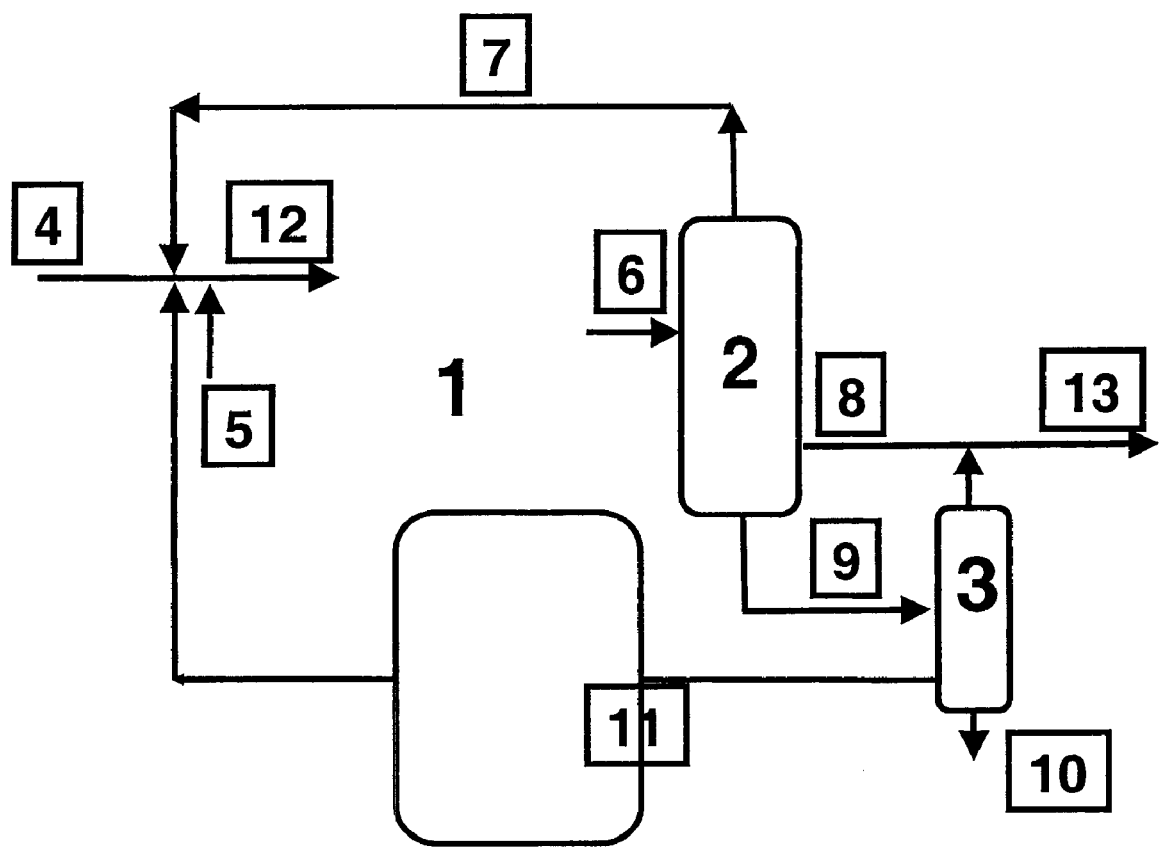
FIG. 1 illustrates a process flow chart for one embodiment of the invention.

The invention thus pertains to a process for preparing polycrystalline silicon, in which a reaction gas comprising hydrogen and a silicon-containing gas are introduced into a reaction chamber, the silicon-containing gas is thermally decomposed over heated silicon and deposited onto the silicon, and forms an offgas, which is separated into a first offgas fraction comprising trichlorosilane and chlorosilanes having a lower boiling point than trichlorosilane, and a second offgas fraction comprising components having a higher boiling point than trichlorosilane, the first offgas fraction is supplied to the reaction gas of a polycrystalline silicon deposition, the second offgas fraction is separated into tetrachlorosilane and a high boiler fraction consisting of high boilers, with or without tetrachlorosilane, and the high boiler fraction is added to the reaction gas of a silicon deposition wherein the reaction gas is heated to a temperature which ensures that the high boiler fraction is present in gaseous form on entry into the reaction chamber of the deposition reactor.

It has been surprisingly discovered that the high-boiling components are depleted efficiently in deposition reactors and do not increase to the high boiler concentrations in the offgas beyond those which are typical of the particular deposition reactors and the deposition processes therein.

The process according to the invention enables direct reutilization of the high boilers from the polysilicon deposition in the polysilicon deposition. This converts the high boilers to silicon or monomeric chlorosilanes in such a manner as to add value. It thus also enables, for the first time, economic and environmentally friendly operation of deposition processes for polycrystalline silicon in which large amounts of high boilers are obtained in the offgas. It additionally reduces losses of silicon and chlorine in the preparation of polycrystalline silicon. Moreover, it avoids separation and purification steps in the workup of the offgas from the polysilicon deposition. A separate chemical conversion which is required according to the prior art (such as dismutation, cracking or hydrogenation) or the costly disposal of these offgas components, are avoided.

In a preferred process variant, the high boiler fraction is heated before being supplied to the reaction gas to a temperature at which the high boiler fraction is present in gaseous form.

The reaction chamber is either the reaction chamber of a Siemens reactor or the reaction chamber of a fluidized bed reactor. Corresponding deposition processes without inventive offgas recycling are known, for example, from U.S. Pat. No. 3,933,985 or WO 02/100776 A1.

The silicon rods in a Siemens reactor, in the course of conversion of the high boiler-containing reaction gases, preferably have a temperature of from 900 to 1413° C., more preferably from 1100 to 1413° C.

The granule particles in a fluidized bed reactor, in the course of conversion of the high boiler-containing reaction gases, preferably have a temperature of from 800 to 1400° C., more preferably from 950 to 1050° C.

The high boiler-containing reaction gas is preferably heated in the inventive process to a temperature of from 300 to 590° C. at a pressure of from 1 to 8 bar absolute, it being essential that full evaporation of the high-boiling components is ensured.

For practical reasons, the high boiler fraction preferably contains tetrachlorosilane in an amount which ensures the free flow of the high boiler fraction, which is difficult to convey owing to the high viscosity without a tetrachlorosilane content. The tetrachlorosilane content is preferably below 50% by weight. With an appropriate level of technical complexity, it would, however, also be possible to use a high boiler fraction consisting of 100% high boilers.

If a proportion of >5% by weight of extremely high-boiling components (compounds with boiling points above 300° C.) is present in the high boiler fraction, it is preferred to remove these components from the high boiler fraction, preferably by distillation. This can be done, for example, by means of a bottom draw on the distillation column, the high boiler fraction for use in the process according to the invention being withdrawn at a side draw of the distillation column.

The chlorosilane composition in the high boiler-containing reaction gas is preferably as follows: 0-10% by weight of dichlorosilane, 90-99.9% by weight of trichlorosilane, 0-5% by weight of tetrachlorosilane, 0.01-5% by weight of high boilers. The chlorosilane composition in the high boiler-containing reaction gas is more preferably as follows: 0-10% by weight of dichlorosilane, 90-99.9% by weight of trichlorosilane, 0-0.5% by weight of tetrachlorosilane, 0.01-0.5% by weight of high boilers. The main components of the high boilers (i.e. more than 90% by weight of the high boilers in total) are in both cases $Si_2Cl_6$, $HSi_2Cl_5$ and $H_2Si_2Cl_4$.

The invention also relates to the use of a reaction gas consisting of hydrogen and one of the aforementioned chlorosilane compositions for preparing polycrystalline silicon in a Siemens reactor or a fluidized bed reactor.

The tetrachlorosilane removed from the fraction having a higher boiling point than trichlorosilane can be supplied, for example, to a high-temperature conversion, as known from U.S. Pat. No. 3,933,985.

Preferably, the offgases of a plurality of deposition plants are combined with one another, and after the separation, the high boiler fraction is supplied to the reaction gas for one or more Siemens reactors or one or more fluidized bed reactors. More preferably, the high boiler fraction from the offgases obtained in the deposition by means of Siemens processes is supplied to the reaction gas of a trichlorosilane-based fluidized bed polysilicon deposition.

In the studies which lead to the present invention, it was surprisingly discovered, in the case of recycling of the amounts of high boilers obtained in the deposition in the Siemens process into the same deposition reactors, an only insignificantly higher equilibrium concentration of high boilers in the offgas of these deposition reactors is established, without the deposition product, i.e. the quality and yield of the polysilicon rods, being adversely affected. For example, in a conventional Siemens reactor, there is a rise in the high boiler concentration in the offgas condensate from 0.35% by weight to 0.37% by weight.

In the addition of this offgas fraction to the reaction gas of a trichlorosilane-based silicon granule deposition in a fluidized bed, high boilers from the offgas condensate from the Siemens process can be added to the reaction gas at up to 3% by weight without a measurable high boiler concentration (>0.01% by weight) being observable in the offgas of the fluidized bed, and without the deposition product deteriorating. Preference is therefore given to supplying up to 5% by weight, preferably from 0.01 to 3% by weight, of high boilers to the reaction gas.

Since virtually no high boilers are measured in the condensate in trichlorosilane-based fluidized bed silicon granule deposition under customary deposition conditions, one process combination, in which the high boiler fraction of the offgases obtained from Siemens deposition of polycrystalline silicon are added to the reaction gas of a fluidized bed deposition for preparing polycrystalline silicon, enables full utilization of the high boilers from the Siemens deposition in one process. This process variant is therefore particularly preferred in accordance with the invention.

The process conditions under which the deposition processes are carried out correspond to the parameters customary in these deposition processes.

The process thus also enables utilization of rod deposition reactors whose deposition behavior has been optimized, for example, by means of flow-influencing cooled internals, but have not been of economic benefit to date because they disadvantageously had a higher level of high boilers in the offgas. The high boiler fractions of the offgases of these reactors can be disposed of by addition to the reaction gas in reactors which have a low level of high boilers.

The invention thus also relates to a process, wherein the high boiler condensate of a deposition with a high level of high boilers is supplied to the reaction gas of a deposition with a low level of high boilers.

FIG. 1 shows a schematic of one embodiment of the inventive process, in which the high boiler fraction from a Siemens reactor for generation of polysilicon rods is recycled into the same reactor (see also Ex. 1). In such a process variant, preferably from 0.01 to 0.5% by weight of high boilers are added to the reaction gas, the reaction gas is heated to from 300 to 590° C. and the deposition is effected at a temperature of the silicon rods of from 1100 to 1413° C.

The reference numerals mean:
1: reactor for deposition of silicon rods
2: distillation of the chlorosilane condensate from the reactor offgas
3: distillation of the high boiler/tetrachlorosilane mixture from the distillation 2
4: trichlorosilane feed for the deposition reactor
5: hydrogen feed for the deposition reactor
6: offgas condensate of the deposition reactor
7: "low boiler fraction" from the distillation 2, consisting of trichlorosilane and lower-boiling chlorosilane components such as dichlorosilane and monochlorosilane
8: optional side draw from the distillation 2, consisting of tetrachlorosilane
9: "high boiler fraction" from distillation 2, consisting of tetrachlorosilane and higher-boiling chlorosilane components ("high boilers")
10: optional discharge of high-boiling chlorosilane components with a boiling point greater than 300° C.
11: "high boiler fraction" for recycling into the deposition, consisting of an optional fraction of tetrachlorosilane and higher-boiling chlorosilane components
12: reaction gas for the deposition reactor comprising fully evaporated chlorosilane components, including "high boilers"
13: tetrachlorosilane from distillation 3 with an optional fraction from distillation 2. The product is either discharged from the system or can, after conversion to trichlorosilane, be supplied back to the deposition.

Figure 2:
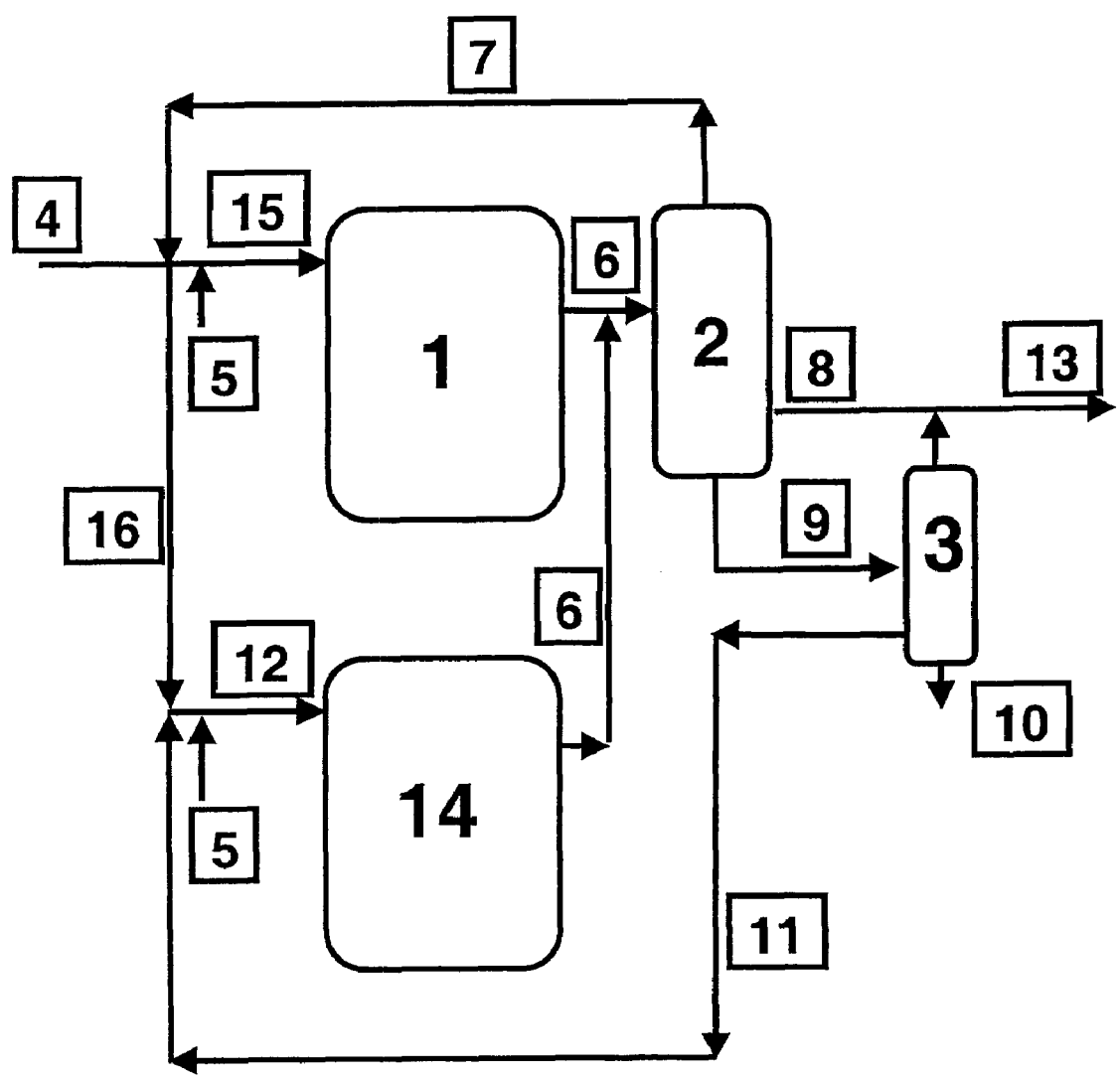
FIG. 2 illustrates a process flow chart for a further embodiment of the invention.

FIG. 2 shows a schematic of a further embodiment of the process of the invention, in which the high boiler fraction from the offgases of a Siemens reactor for generating polysilicon rods with a high level of high boilers is recycled into a Siemens reactor for generating polysilicon rods with a low level of high boilers. In such a process variant, preferably from 0.01 to 5% by weight of high boilers are added to the reaction gas, the reaction gas is heated to from 300 to 590° C. and the deposition is effected at a temperature of the silicon rods of from 1100 to 1413° C.

The reference numerals, where they are not identical to FIG. 1, mean:

14: reactor for deposition of silicon rods, the high boiler fraction which arises in this reactor being lower than in reactor 1
15: reaction gas for the deposition reactor 1, without added high boiler fraction
16: chlorosilane feed, consisting of a mixture of trichlorosilane (4) and low boiler fraction (7)

Figure 3:
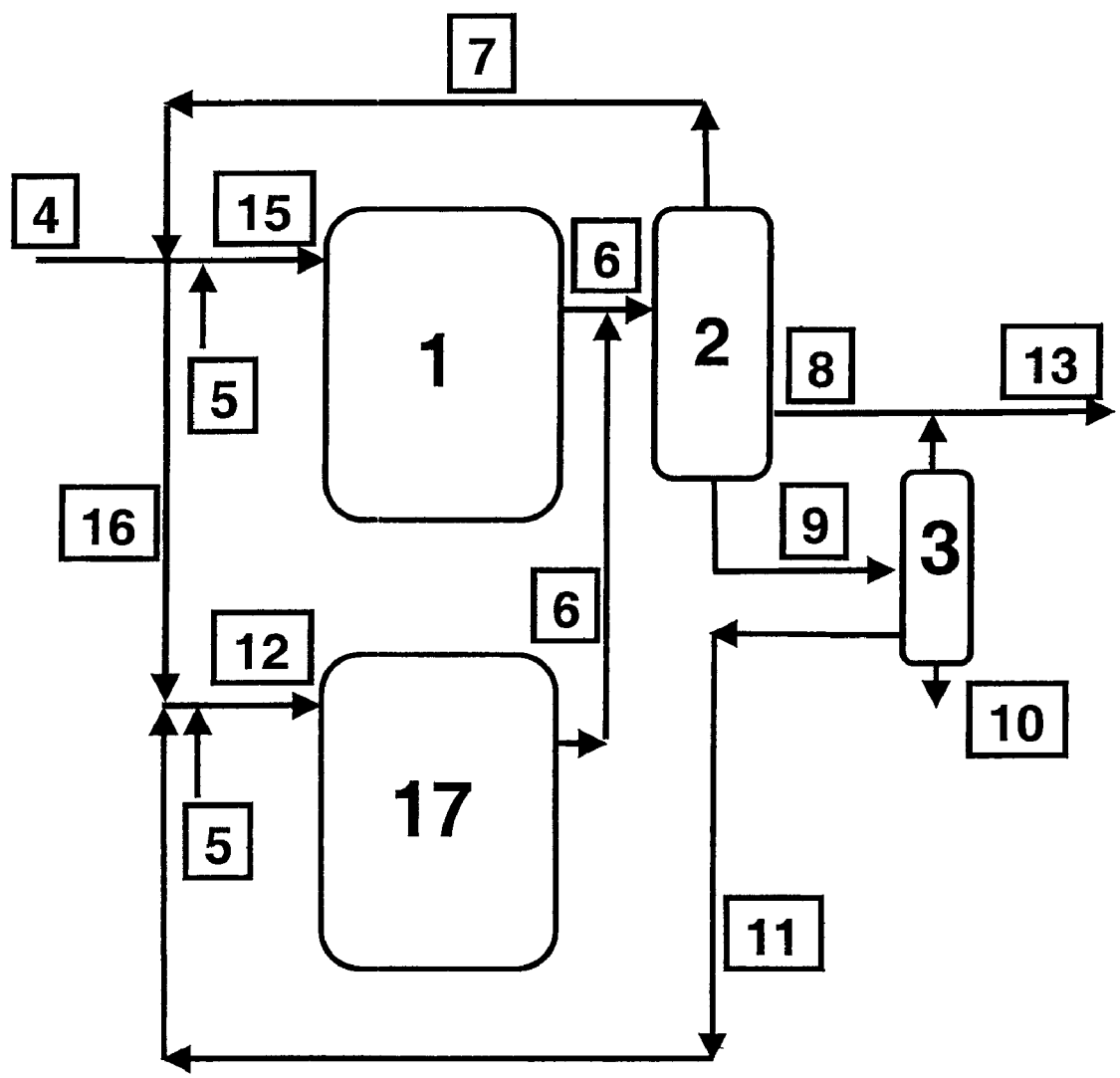
FIG. 3 illustrates a process flow chart for a yet further embodiment of the invention.

FIG. 3 shows a schematic of a yet further embodiment of the process of the invention, in which the high boiler fraction from the offgases of a Siemens reactor for generating polysilicon rods is recycled into a fluidized bed reactor for generating silicon granules. In such a process variant, preferably from 0.01 to 3% by weight of high boilers are added to the reaction gas, the reaction gas is heated to from 300 to 590° C. and the granule particles in the fluidized bed reactor, in the course of conversion of the high boiler-containing reaction gases, have a temperature of from 800 to 1400° C., more preferably from 950 to 1050° C. The particular advantage of this variant is that virtually no high boilers (>0.01% by weight) are present in the offgas condensate, and so no high boiler removal has to be effected.

The reference numerals, where they are not identical to FIG. 1 or 2, mean:
17: reactor for deposition of polysilicon granules, the high boiler fraction which forms in this reactor being significantly lower than in the rod deposition reactor 1.

The examples which follow serve to further illustrate the invention.

EXAMPLE 1

Recycling of the High Boiler Fraction from the Condensate of a Siemens Reactor into the Same Siemens Reactor A prior art polysilicon deposition operated with a Siemens reactor had, in standard operation without high boiler recycling, a high boiler content of 0.35% by weight in the offgas condensate. The concentration of the high boiler content in the condensate was determined with the aid of regularly taken samples, which were analyzed by means of gas chromatography. The condensate was supplied to a distillation column in which the components having a boiling point of trichlorosilane and lower were removed via the top and supplied back to the same deposition reactor by adding them to the trichlorosilane feed. The column bottoms, consisting of tetrachlorosilane and high boilers, were fed to a further distillation column in which the high boilers were concentrated up to a content of 50% by weight in the bottom. Further concentration was dispensed with in order to be able to convey the column bottoms in liquid form without any problem. These bottoms were added to the chlorosilane stream, which formed a portion of the reaction gas for the deposition reactor, the high boiler fraction having been obtained from the offgas thereof, in such an amount as to establish a high boiler content and a tetrachlorosilane ("tetra") content of in each case 0.3% by weight in this chlorosilane stream. An appropriately high evaporator temperature (400° C.) was used to ensure that all components were evaporated fully on entry into the reactor. In spite of these additional components in the reaction gas of the deposition, the high boiler content in the condensate of the offgas stream downstream of the deposition barely changed. An average of 0.37% by weight high boiler content was now measured, the difference of 0.02% by weight being within normal process and sampling variations and therefore being insignificant. The polysilicon yield from the reactor and the polysilicon properties were the same with and without recycling of the high boiler content.

EXAMPLE 2

Recycling of the High Boiler Fraction from a Siemens Reactor with High High Boiler Content into the Same Siemens Reactor Owing to altered geometries and additional internals compared to the deposition reactor from example 1, this reactor, with otherwise identical deposition parameters, now had 3% by weight of high boilers in its offgas condensate. The concentration was determined by means of regularly taken samples which were analyzed by means of gas chromatography analogously to example 1. As in example 1, this condensate was supplied to a distillation column in which the components with a boiling point of trichlorosilane and lower were removed via the top and supplied back to the deposition. The column bottoms, consisting of tetrachlorosilane and high boilers, were supplied to a further distillation column in which the high boilers were concentrated up to a content of 50% by weight in the bottom. Further concentration was dispensed with in order to be able to convey the column bottoms in liquid form without any problem. These bottoms were added to the chlorosilane stream for the deposition in such an amount that, in this feed stream, a high boiler content and tetra content of 2.6% by weight, in each case, was established. An appropriately high evaporator temperature of 450° C. was used to ensure that all components had evaporated fully on entry into the reactor. In spite of these additional components in the reaction gas of the deposition, the high boiler content in the condensate downstream of the deposition did not change; an average of 3% by weight was again measured. The polysilicon yield from the reactor this time fell, within the accuracy of measurement, by 2% to a maximum of 5%, while the polysilicon properties were unchanged.

EXAMPLE 3

Recycling of the High Boiler Fraction from a Siemens Reactor with an Elevated Level of High Boilers into a Siemens Reactor with a Low Level of High Boilers In this example, the high boiler condensate from the Siemens reactor of example 1 was added to the Siemens reactor according to example 1. In the chlorosilane feed stream, a high boiler content and tetra content of 2.2% by weight of each was established. An appropriately high (450° C.) evaporator temperature was used to ensure that all components had evaporated fully on entry into the reactor. In spite of these additional components in the reaction gas of the deposition, the high boiler content in the condensate downstream of the deposition was unchanged. An average of 0.37% by weight of high boilers in the offgas condensate was measured. The polysilicon yield from the reactor and the polysilicon properties were unchanged with and without recycling of the high boiler fraction.

EXAMPLE 4

Recycling of the High Boiler Fraction from a Siemens Reactor into a Granule Deposition Reactor The offgas condensate of a granule fluidized bed deposition according to DE 102007021003 example 1 was analyzed for high boilers. With a conventional trichlorosilane feed (100% trichlorosilane in the chlorosilane feed), the condensate had a high boiler content of less than 0.01% by weight. The concentration was determined by means of regularly taken samples which were analyzed by means of gas chromatography. The high boiler fractions (tetrachlorosilane content 50% by weight) from example 1 and example 2 with a resulting 0.3 and 2.6% by weight respectively in the chlorosilane feed were then added to the reaction gas for the fluidized bed reactor. An appropriately high evaporator temperature of 560° C. was used to ensure that all components had evaporated fully on entry into the reactor. In spite of these additional high-boiling components in the reaction gas of the deposition, the high boiler content in the condensate downstream of the deposition did not change to a measurable degree. It was still <0.01% by weight.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for preparing polycrystalline silicon, comprising introducing a reaction gas comprising hydrogen and a silicon-containing gas into a reaction chamber of a silicon deposition reactor and thermally decomposing the silicon-containing gas onto heated silicon, forming an offgas; and
    separating the offgas into a first offgas fraction comprising trichlorosilane and chlorosilanes having a lower boiling point than trichlorosilane, and a second offgas fraction comprising components having a higher boiling point than trichlorosilane;
    supplying the first offgas fraction to the reaction gas of a polycrystalline silicon deposition;
    separating the second offgas fraction into a tetrachlorosilane fraction, and a high boiler fraction containing high boilers, optionally still containing tetrachlorosilane; and
    supplying the high boiler fraction to trichlorosilane-containing reaction gas of a silicon deposition and heating the reaction gas to a temperature at which the high boiler fraction is present in gaseous form on entry into the reaction chamber of the deposition reactor.

2. The process of claim 1, wherein the high boiler fraction is heated to a temperature at which the high boiler fraction is present in gaseous form before being supplied to the reaction gas.

3. The process of claim 1, wherein the reaction chamber is the reaction chamber of a Siemens reactor or the reaction chamber of a fluidized bed reactor.

4. The process of claim 1, wherein the high boiler condensate of a first deposition which produces a high level of high boilers, >0.3% by weight in the offgas condensate of the first deposition, is supplied to the reaction gas of a second deposition which produces a lower level of high boilers in the offgas condensate of the second deposition.

5. The process of claim 4, wherein the lower level of high boilers is less than 0.1% by weight of the offgas from the second deposition.

6. The process of claim 1, wherein the silicon rods in a Siemens reactor used for high boiler utilization, in the course of conversion of the high boiler-containing reaction gases, have a temperature of from 900 to 1413° C.

7. The process of claim 1, wherein the silicon rods in a Siemens reactor used for high boiler utilization, in the course of conversion of the high boiler-containing reaction gases, have a temperature of from 1100 to 1413° C.

8. The process of claim 1, wherein the granule particles in a fluidized bed reactor used for high boiler utilization, in the course of conversion of the high boiler-containing reaction gases, have a temperature of from 800 to 1400° C.

9. The process of claim 1, wherein the granule particles in a fluidized bed reactor used for high boiler utilization, in the course of conversion of the high boiler-containing reaction gases, have a temperature of from 950 to 1050° C.

10. The process of claim 1, wherein the high boiler-containing reaction gas is heated to a temperature of from 300 to 590° C. at a pressure of from 1 to 8 bar absolute.

11. The process of claim 1, wherein the offgases of a plurality of deposition plants are combined with one another and the high boiler fraction from the offgas is supplied to the reaction gas of one or more Siemens reactors or of one or more fluidized bed reactors.

12. The process of claim 1, wherein the high boiler fraction from the offgas of a Siemens reactor is supplied to the reaction gas of a trichlorosilane-based fluidized bed polysilicon deposition.

13. The process of claim 1, wherein high boilers from the offgases are added to the reaction gas at up to 5% by weight.

14. The process of claim 12, wherein high boilers from the offgases are added to the reaction gas at up to 5% by weight.

15. The process of claim 1, wherein the high boiler fraction contains tetrachlorosilane, in an amount of less than 50% by weight.

16. The process of claim 1, wherein the high boiler fraction contains tetrachlorosilane, in an amount of less than 5% by weight.

17. The process of claim 1, wherein the high boiler fraction contains tetrachlorosilane in an amount of from 0.5% to 50% by weight.

18. The process of claim 1, wherein the high boiler fraction contains tetrachlorosilane in an amount of from 0.5% to 5% by weight.

* * * * *